Feb. 27, 1968   R. ÖSTREICHER   3,371,194
SUPERVISORY ARRANGEMENT FOR ELECTRIC ACCUMULATORS
Filed April 8, 1965

INVENTOR.
ROBERT ÖSTREICHER
BY McGlew and Toren
attorneys

United States Patent Office 3,371,194
Patented Feb. 27, 1968

3,371,194
SUPERVISORY ARRANGEMENT FOR ELECTRIC ACCUMULATORS
Robert Östreicher, Teningen, Baden, Germany, assignor to Messrs. Frako Kondensatoren- und Apparatebau G.m.b.H., Teningen, Baden, Germany, a corporation of Germany
Filed Apr. 8, 1965, Ser. No. 446,554
Claims priority, application Germany, Apr. 8, 1964, F 42,558
4 Claims. (Cl. 235—92)

ABSTRACT OF THE DISCLOSURE

The disclosure is directed to a supervisory arrangement for electric accumulators, such as storage batteries, and which indicates the number of charging cycles, the total number of ampere hours discharged from the battery and the remaining battery capacity. The means for indicating the remaining or available battery capacity also indicates the number of times the battery has been discharged below 20 percent of its capacity.

Figure 1:
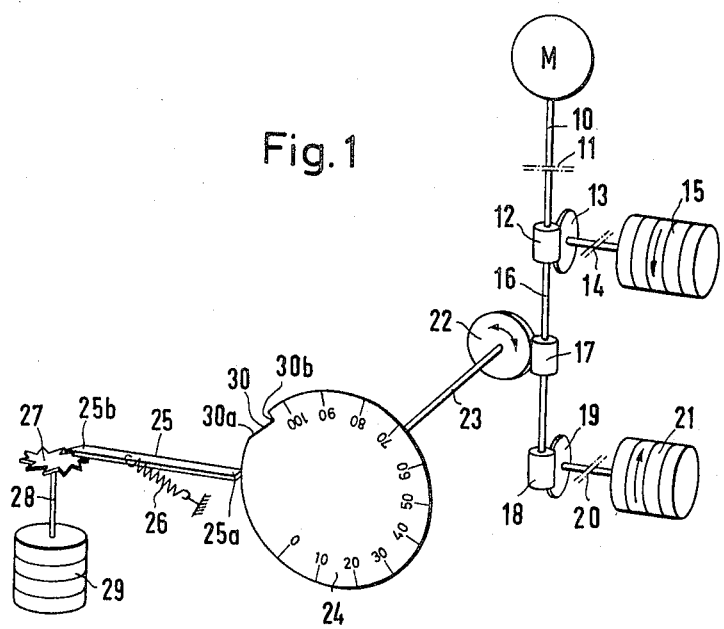

The various counting means are operated by an ampere-hour meter driving motor having the battery current flowing therethrough during both discharge and charge. The supervisory arrangement of the disclosure is intended as part of an overall supervisory arrangement for electric accumulators, such as storage batteries, wherein the charging operation of a battery may be controlled in accordance with the number of discharge-charge cycles of the battery.

Background of the invention

This invention relates to a supervisory arrangement for electric accumulators, such as storage batteries.

According to the present invention there is provided a supervisory arrangement for electric accumulators, wherein the state of charge of the accumulator is indicated by means of an ampere-hour meter and, where necessary, the charging operation is controlled, and wherein means are provided by which the counting speed of the ampere-hour meter may be varied in dependence upon the number of charging cycles of the accumulator, characterised in that there is provided a counter which is actuated by the indicating device when the capacity of the battery falls below a predetermined value.

Preferably, a notch may be provided, in the periphery of an indicating disc, at a point corresponding to less than 20% of the battery capacity, and there may be provided a lever or the like which is resiliently pressed at one end against the periphery of the disc and engages at its other end in the teeth of a stepping wheel actuating the counter. With the aid of such a device, it is possible to record instances when the capacity of the battery falls below a predetermined value. This is particularly important, because discharge of the accumulator below a capacity value of 20% may cause considerable damage to the plates.

For an understanding of the principles of the invention, reference is made to the following description of a typical embodiment thereof as illustrated in the accompanying drawings.

Figure 2:
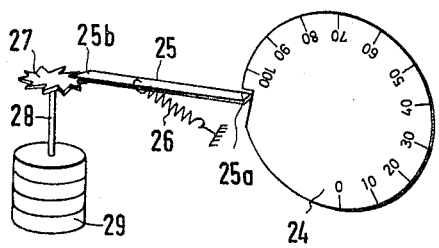

In the drawings:

FIG. 1 is a somewhat schematic illustration of a supervisory arrangement for electric accumulators embodying the invention; and FIG. 2 is a view of a part of FIG. 1 illustrating certain parts thereof in another position.

In FIGURE 1 of the drawings, there is denoted by M a meter motor which drives the shaft 10. 11 is a slipping clutch through which the shaft 16 is driven, there being mounted on shaft 16 the worms 12, 17 and 18. The worm 12 engages with the worm wheel 13, which actuates a charge cycle stepping mechanism. The charge cycle stepping mechanism 14 actuates the counter 15 at each change from charging of the battery to discharging or vice versa. Thus, the number of charging cycles can be read from the counter 15.

The worm 18 engages with the worm wheel 19, which drives the counter 21 through a clutch 20. The clutch 20 is so constructed that the counter 21 is driven only when the shaft 16 rotates in one direction, preferably when it rotates in the direction corresponding to discharge of the battery. Consequently, the total number of ampere-hours taken from the battery can be read from the counter 21.

The worm 17 also provided on the shaft 16 engages with a worm wheel 22 which moves the indicating disc 24 through a shaft 23. The indicating disc 24 is provided with a scale on which the capacity still available in the battery can be read.

The periphery of the disc 24 is formed with a notch 30 having an edge 30a of small inclination and a steep edge 30b. In addition, a slider 25 is so mounted laterally of the disc as to be displaceable in the direction parallel to the plane of the disc. Slider 25 is pulled by the spring 26 so that its end 25a bears against the periphery of the disc 24. The other end 25b of the slider 25 engages in the teeth of a stepping wheel 27 which drives a counter 29 through a shaft 28.

There corresponds to the graduation line 0 on the indicating disc 24 a value below which the battery capacity normally should not fall, for example a battery capacity of 20%. The notch 30 is situated at a point of the indicating disc 24 which corresponds to an even lower capacity value. When the battery is discharged below this a latter capacity value, the end 25a of the slider 25 slides over the edge 30a into the notch 30, whereby the end 25b of the slider 25 is brought over one tooth of the stepping wheel 27 into the next tooth gap. On re-charging of the battery, disc 24 is rotated in a clockwise direction and the slider 25 is again moved by the less steeply inclined edge 30a against the pulling direction of the spring 26, whereby the stepping wheel is moved by the end 25b and the counter 29 is thus stepped forwards. Consequently, there can be read from the counter 29 the number of discharges at which the capacity of the battery has fallen below a predetermined value. Such an indication is of great importance for assessing the quality of a battery, because when the capacity of the battery falls below a value of 20%, for example, sulphating of the battery plates occurs.

If the charging of the battery is continued beyond the fully charged state, i.e. beyond the graduation line 100 on the indicating disc, the end 25a of the slider 25 again engages in the notch 30. At discharge, i.e. on rotation of the disc in the counter-clockwise direction, the slider 25 is rocked out of its normal position by the steep edge 30b of the notch 30, so that its end 25b is removed from the teeth of the stepping wheel 27, and in this case the counter 29 is not stepped forwards. Thus, the said counter is stepped forwards only when the end 25a of the slider 25 is situated in the notch 30 and the disc 24 is then rotated in the clockwise direction.

Of course, the stepping wheel 27 need not necessarily be actuated with the aid of the slider 25 illustrated in the drawings, but there may be provided, for example, a lever rockable in a plane perpendicular to the plane of the disc, which lever is forced at one end against the periphery of a disc and engages at its other end in the teeth of the stepping wheel parallel to the plane of the disc 24.

The counter 29 may also be actuated in other ways, for example by means of an electromagnet. In this case, the stepping wheel 27 is not required, and an electric contact is provided, which is actuated by the end 25b and controls the energisation of the electromagnet.

The above described supervisory arrangement for electric accumulators is a development of those described in German patent application No. F 37,293, which corresponds to co-pending U.S. patent application, Ser. No. 293,733, filed July 9, 1963, in which the present applicant is a co-applicant, and now U.S. Patent No. 3,271,652, issued Sept. 6, 1966, and assigned to the assignee of the present application. This patent illustrates a supervisory arrangement wherein the state of charge of the accumulator is indicated by means of an ampere-hour meter and, where necessary, the charging operation is controlled, and further illustrates such a supervisory arrangement in which means are provided by which the counting speed of the ampere-hour meter may be varied in dependency upon the number of charging cycles of the accumulator.

I claim:
1. A supervisory arrangement for electric accumulators comprising, in combination, an ampere-hour meter connected for flow of the accumulator current therethrough; indicator means driven by said meter and indicating the charging-discharging condition of said accumulator; charging cycle counting means; and means operatively interconnecting said indicating means and said counting means and operable by said indicating means to operate said counting means only responsive to the accumulator capacity decreasing below a predetermined value.

2. A supervisory arrangement, as claimed in claim 1, in which said indicator means includes a charge state indicating disc driven by said meter and formed with a peripheral notch at a point corresponding to less than about 20 percent of the accumulator capacity; said counting means comprising a counter and stepping means operating said counter; said operatively interconnecting means comprising actuator means connected to said stepping means and means biasing said actuator means into engagement with the periphery of said said indicating disc, said actuator means, responsive to engagement thereof in said peripheral notch, operating said stepping means to step said counter.

3. A supervisory arrangement, as claimed in claim 2, in which said stepping means comprises a toothed ratchet stepping wheel; said actuator means comprising a lever having an end operatively engaged with said ratchet wheel.

4. A supervisory arrangement, as claimed in claim 3, in which said notch has a steep edge facing in the direction of movement of said indicating disc during discharge of said accumulator; said lever being mounted for rocking in the direction of movement of the indicating disc during discharge of said accumulator, whereby the end of said lever engaged with said ratchet wheel is disengaged from the teeth of the latter.

References Cited

UNITED STATES PATENTS 3,271,652   9/1966   Walz et al. _____ 320—44

MAYNARD R. WILBUR, *Primary Examiner.*

JOHN F. COUCH, *Examiner.*

S. WEINBERG, G. J. MAIER, *Assistant Examiners.*